US005369273A

United States Patent [19]

Fisun et al.

[11] Patent Number: 5,369,273

[45] Date of Patent: Nov. 29, 1994

[54] METHOD FOR LABELING AN OBJECT USING LASER RADIATION

[75] Inventors: Oleg I. Fisun; Lev N. Lupichev; Viktor V. Maklakov, all of Moscow, Richard Schimko, Berlin, Germany

[73] Assignee: BORUS Spezialverfahren und -geräte im Sondermaschinen-bau GmbH, Berlin, Germany

[21] Appl. No.: 117,834

[22] Filed: Sep. 8, 1993

[30] Foreign Application Priority Data

Sep. 8, 1992 [DE] Germany ............................ 4230551

[51] Int. Cl.[5] ............................................ G06K 1/12

[52] U.S. Cl. .................................................. 250/271

[58] Field of Search ........................................ 250/271

[56] References Cited

U.S. PATENT DOCUMENTS 3,852,088 12/1974 Godlewski et al. .................... 117/1
4,039,827 8/1977 Zdrok et al. ......................... 250/271
4,368,979 1/1983 Ruell .................................. 250/271
4,744,647 5/1988 Meshel et al. ........................ 351/177
5,206,496 4/1993 Clement et al. ...................... 250/271

FOREIGN PATENT DOCUMENTS 157546 10/1985 European Pat. Off. .
278058 8/1988 European Pat. Off. .
415903 3/1991 European Pat. Off. .
449318 10/1991 European Pat. Off. .
481388 4/1992 European Pat. Off. .
2560119 8/1985 France .
2588509 4/1987 France .
1696714 12/1970 Germany .
3025267 1/1981 Germany .
3425263 1/1985 Germany .
3411797 10/1985 Germany .
3723856 1/1989 Germany .
3147385 5/1990 Germany .

*Primary Examiner*—Jack I. Berman
*Attorney, Agent, or Firm*—Spencer, Frank & Schneider

[57] ABSTRACT

Method for applying an object with a label using local radiation of the object in a predetermined area of the object with high energy electromagnetic radiation whereby the radiation is of a wavelength outside the visible but within the optical range of the spectrum of electromagnetic radiation and that at this wavelength the material of the predetermined area of the object has a maximum of spectral absorption and the parameters of the radiation as a result of material based preliminary tests are thus predetermined that due to the interaction of the radiation with the molecule structure in the predetermined area of the object a permanent altering of the optical characteristics is induced which is perceptable when illuminated in the wavelength range of the absorption maximum, but that the area of the object is not mechanically altered and/or that when illuminated with visible light is not perceptably altered.

11 Claims, 5 Drawing Sheets

METHOD FOR LABELING AN OBJECT USING LASER RADIATION

SPECIFICATION

Figure 1:
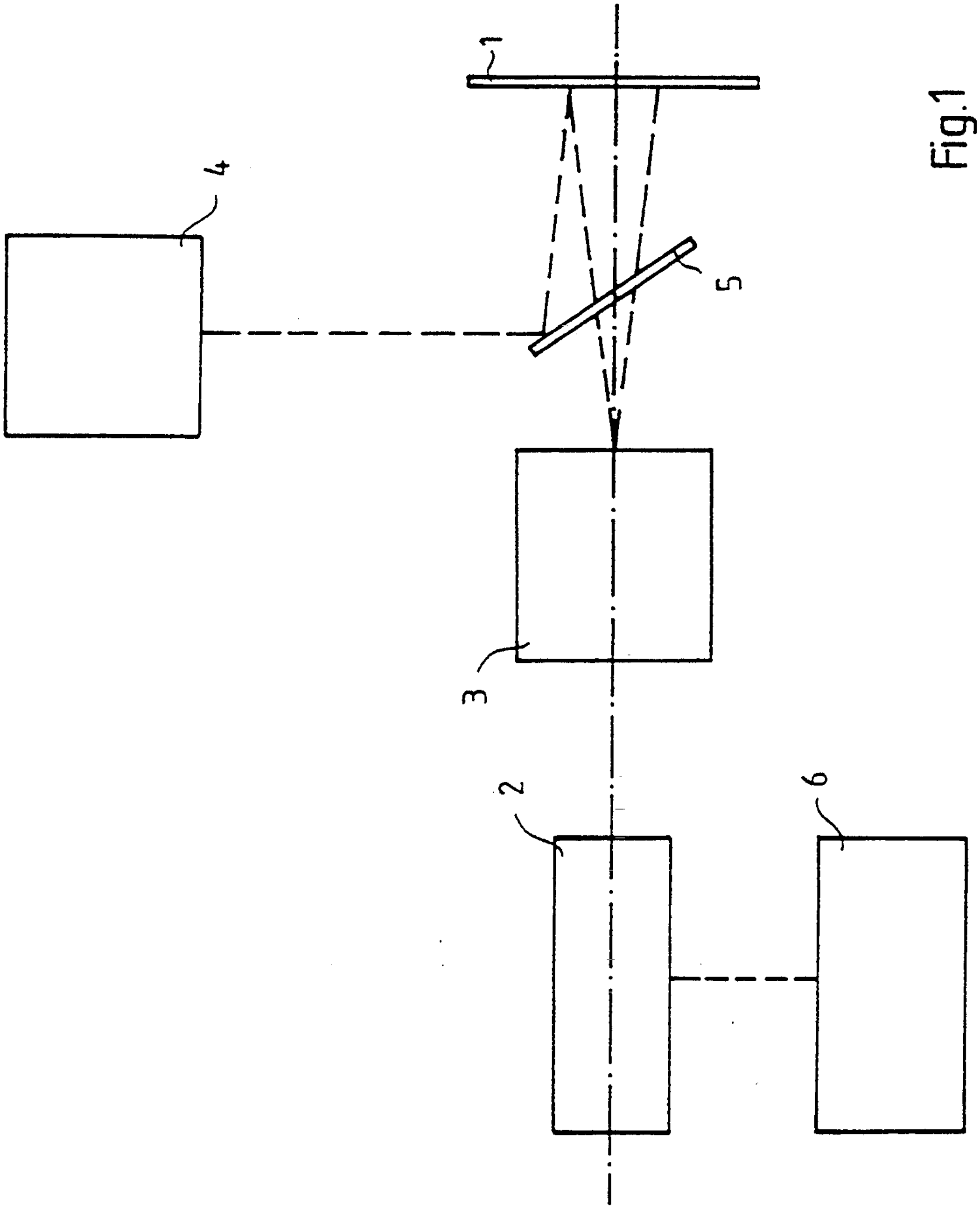

The invention relates to a method for labeling an object by local radiation of the object in a predetermined area thereof by high energy electromagnetic radiation, and a device to carry out the method.

Methods for labeling objects and materials using laser radiation are known.

A method is disclosed in the FR-PS 2 560 119 (French patent specification) which utilizes a so-called stream-laserhead. The object to be labeled is carried via a conveyor belt in front of the stream-laserprinthead. The laserhead is positioned and moved by a device which is controlled by a microprocessor in order to sequentially create a prescribed writing pattern. For example the positions of a number of prescribed letters and digits are thereby defined by their coordinates. Three photoelements control the position of the object to be labeled on the conveyor belt. When the object has reached a certain position the stream-laserprinthead activates and puts the labels onto the surface material dot by dot. A raster matrix consists for example of thirty horizontal and thirty vertical dots. A subsequent reading device then supervises the quality of the installed labels.

This known method has the disadvantage that the labels can only be installed on preferably rectangular objects. The method is therefore only implemented to label packaging (boxes and the like).

A method to label plastic parts is known from the DE 34 11 797 A1 (German Offenlegungsschrift) with which visible labels (for example non-erasable key coding inscriptions) are written into a laser light absorbing plastic layer under a transparent layer by a laser beam.

A method to label laminated glass panes is disclosed in DE 31 47 385 C2 (German Patent) with which by using a laser beam a visible label is written into the intermediate layer of a laminated glass which has a different absorption coefficient for the laser radiation than the glass.

These two labeling methods can also only be used for certain objects. With all of the above-mentioned methods labels are created which are clearly visible and therefore forgeable and which also impair the optical impression of the surface of the object.

A method to identify objects which have been mislaid is disclosed by DE 37 23 856 A1 (German Offenlegungsschrift) which uses three different labels of which two labels are only perceptable in UV-light and the Third is of the usual type.

This method seems not to be very practical due to the large amount of labeling and identification work and the crucial of the three labels being no more forgery-proof than any other usual label.

A method to guard currency notes and bonds from forgery is disclosed by FR 2 560 119 B1 (French Patent). This method is based on a fluorescent substance being applied to the surface of the material with a prescribed concentration. It can either be individual areas or the whole surface of the note or bond. During the subsequent illumination of a material which has been treated in such a manner with radiation of a prescribed wavelength the fluorescent substance will light up in a characteristic area in the visible or ultraviolet part of the spectrum.

The neccessity of additionally treating the material with special substances is a disadvantage of this method as these special substances are not only usually detrimental to health but can also be destroyed by external influence.

A method for the coded protection and for the individualized identification of documents which preclude the copying with photocopiers is based on the use of special dyes with a high reflection capacity in a prescribed part of the colour spectrum and is disclosed in the U.S. Pat. No. 3,852,088 B1. The chosen spectral area is characteristic for a certain type of electrostatic photocopiers, so that this color is not noticeable normally, but is very noticeable on the copy after being copied with a photocopier. As, however, the dye absorbs radiation of other wavelengths which are characteristic for photocopiers of another type the protective function is diminished for these. In addition, the color of the document paper can be chosen so that it is masked by a special labeling color. All of these steps can mean that under certain conditions the labelings are not copied when the document is copied.

The last described method has also the disadvantages that on the one hand the material of the object to be protected has to be additionally treated with a special color and that on the other hand this additional layer can be destroyed by external influences.

A method for applying identification labels to bonds is disclosed in FR 2 588 509 (French Patent) which is based on the effect of the aberration of laser radiation through special substances which have been introduced into the paper. The process of the creation of the labels is as follows: The laser radiation is directed onto the paper with the special substances with the help of a diversion mirror which is controlled by a special processor. These substances had already been introduced into the paper during the glueing process. The absorption of the energy of the laser radiation by the special substance leads to the paper being heated locally and therefore arching and a relief structure being formed. The relief formed in this way can be in the form of letters, digits or other signs.

The greatest disadvantage of this method is that a macroscopic, mechanical deformation takes place due to the influence of the laser radiation on the substance. In addition the labeling of the material is only then possible if the special substances have been introduced into the paper beforehand, which means that a previous treatment of the material is neccessary for the labeling procedure.

All of the named methods are either confined to being used on objects and/or materials with a special construction and/or require a large amount of work and only produce labels which can only be seen as being partially forge-proof.

The object of this invention is therefore to provide a method with which invisible labels can non-destructably be applied to almost any non-metallic objects without chemical or mechanical pre-treatment.

This object is solved by the present invention, according to which the wavelength of the radiation is chosen to be beyond the visible but within the optical range of the spectrum of electromagnetic radiation, in a range where there is a maximal spectral absorption of this radiation in the predetermined area of the object with respect to this wavelength. The other parameters of the radiation are predetermined such that, due to the interaction of the radiation with the molecule structure in the predetermined area of the object, a permanent altering of the optical characteristics is induced which is perceptible when irradiated in the wavelength range of the absorption maximum, but in a way that the area of the object is not mechanically altered and/or perceptibly altered when irradiated with visible light.

The invention includes the realization that by way of a local irreversible change of excited states which leads to an alteration of the microstructure of the material of the object to be labeled the optical characteristics of the changed regions of material in the non-visible area of the spectrum are also altered without a mechanical alteration of the structure of the material or an alteration of the optical characteristics when illuminated with visible light taking place.

In order to realize this idea the knowledge that nearly all non-metallic materials, which are used to make basic commodities, packaging etc.—such as plastics, paper and cardboard, glass, ceramics—absorb electromagnetic radiation in such a way, that their absorption curves have maxima outside the visible area of the spectrum and that in them with an intensive enough but with respect to the effective energy input into the material structure exactly dosed radiation at the relevant wavelengths irreversible molecular excitations or microstrucural changes take place without the mechanical characteristics of the material or its optical characteristics in visible light being changed.

(In the following text one should assume, that visible light is meant no be the range of the electromagnetic spectrum which can be seen by the human eye (from about 450 to 800 nm), whereas the "optical range" of the spectrum is meant to be that range in which the laws of optics essentially apply and optical instruments are applied. This range includes the—especially the nearer—infrared range as well as the ultraviolet light range.

Labels created in such a way can no longer be changed by subsequent external influence and are not visible to the human eye without technical devices and are not "feelable" on the material.

With the method according to the invention it is particularly advantageous that neither the surface of the material of the object to be treated nor its structure is damaged. This leads to the advantage that expensive objects such as works of art are not damaged and therefore do not suffer a loss in value. This is a significant advantage in comparison with labeling methods which use x-rays, whereby the object to be labeled has to be combined with elements which are impermeable towards x-rays and which cannot be inserted into the material without damaging it. Due to the undamaged surface the position of the label is also not ascertainable by detailed viewing of the surface structure—such as gloss or rough—.

The wavelength to be chosen for the radiation depends on the molecular structure of the material and is determined experimentally prior to the utilisation of the first preferred method for creating a label by determining the absorption of material over a wide enough wavelength range with the help of one or more light sources which can be altered. If a number of absorption maxima or resonance wavelengths are determined the most distinct or a maximum near to the working wavelength of a labeling light source is used for the labeling-radiation, whereby it must be guaranteed that the chosen wave length also lies in the working range of the light device(s) later used to read the labels.

It is further neccessary to first of all, at least in material respective trials, to determine the optimal effective energy input with which the wanted irreversible change of the molecular excitation states or the microstructure takes place but at which no thermally caused permanent alteration of the mechanical characteristics or texture of the material has taken place.

The creation of labels then takes place with high energy light, preferably with coherent high energy impulse radiation (laser radiation) with a wave-length in the range of a resonance absorption and with a beam speed and beam parameters which give the required value of the effective energy input.

With an advantageous embodiment of the method according to the invention on radiation of the object to be labeled the heat energy created in the material is partially removed or the object is cooled down prior to the radiation to such an extent that the radiated areas can only heat up to such a temperature at which a substantial permanent change of the material due to the radiated or created heat energy can be safely prevented.

With this one can guarantee that apart from the intended label no other clue as to the existence of a label is visible, so that it cannot be found without the use of additional technical devices.

The labeling is carried out in particular with laser radiation with a wavelength which is altered to a resonance maximum in the range from 250 to 450 nm—for example using a nitrogen-, excimer- or dye-laser. In so far as resonance maxima exist in the UV/A-range, that is above approx. 300 nm, this range is preferentially used for labeling due to the availability of inexpensive and simple to use light sources.

By varying the voltage of the impulse-after-frequency of the pump laser with an excimer laser, the local staying time or writing speed and/or the spot diameter of the laser beam and the radiation energy of the laser beam can be set taking into account the possibly required intended cooling so that the local effective energy input exceeds a threshold value neccessary for the creation of a permanent label and whereby the heat energy balance is set such that by taking into account the heat removal the local temperature stays under a temperature at which a substantial permanent deformation or other change of the material of the object to be treated takes place.

The created label is made visible or read by a lighting system with a light wavelength near the resonance absorption. wavelength of the labeled material.

In accordance with the material used the label can advantageously be light on a dark background or dark on a light background.

In particular when using light of a relatively short wavelength it is practical or even neccessary to radiate the object through a stencil in order to form the label. Metal stencils are possible.

If the label is created using a resonance wavelength in the UV-range reading it is easy using a simple broad-banded UV-light source (dark spot). With this the special effect occurs that in the case of whitish or light object material when shone through or in some cases also by the presence of whitish materials in the object area the label "modulates" the flouorescence behaviour of the object or of the other materials. In that way the label is easily made visible for the human eye even though the label light and the illumination light are not in the visible wavelength ranges.

With another advantageous further embodiment of the method according to the invention the label is applied in coded form by using holographic methods whereby the reading of the thus created coded label can also take place with coherent radiation. A direction dependent analysis of the label is then also possible, so that for a possible encoding the direction information for coding is, in addition, also available.

Figure 2:
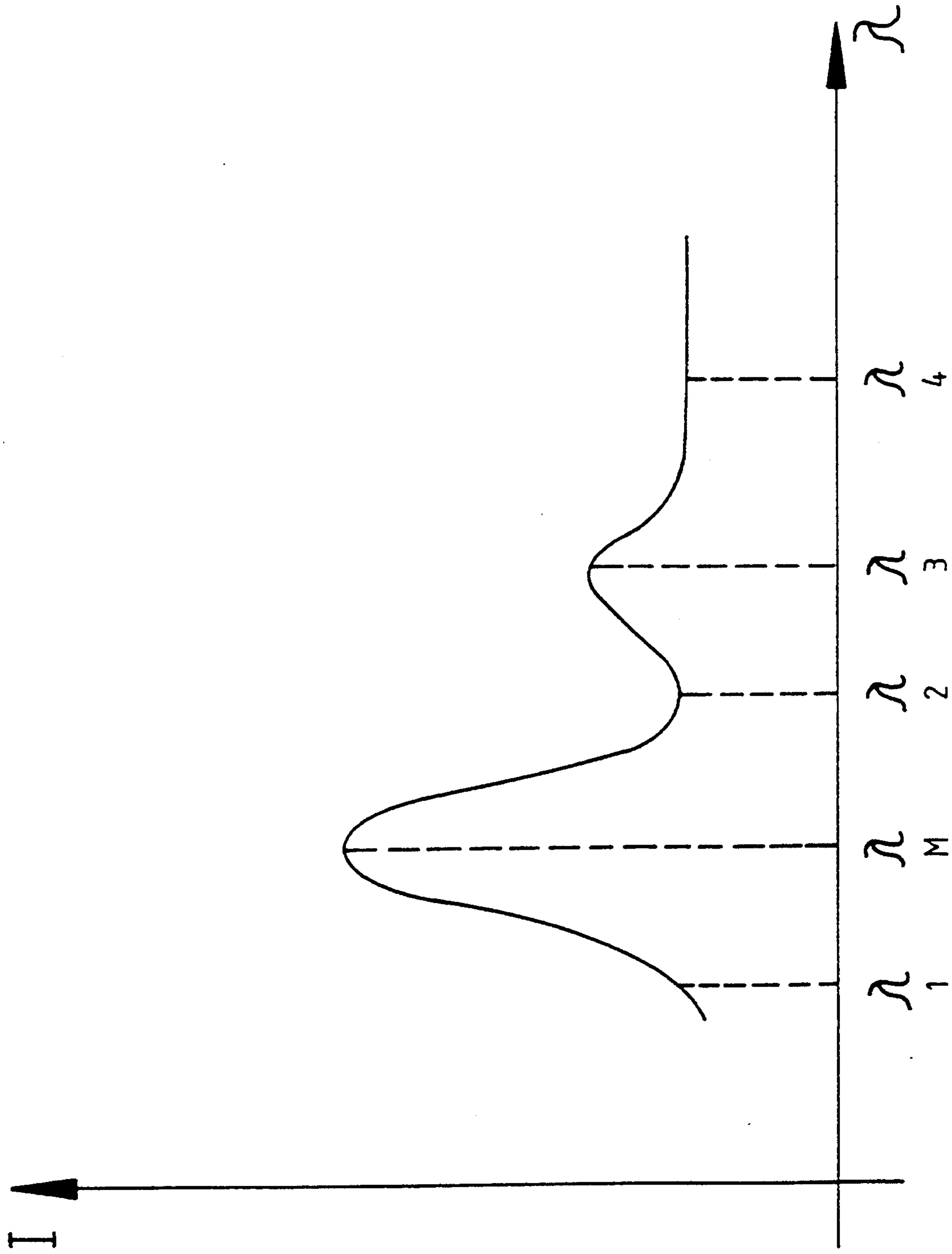
Figure 3:
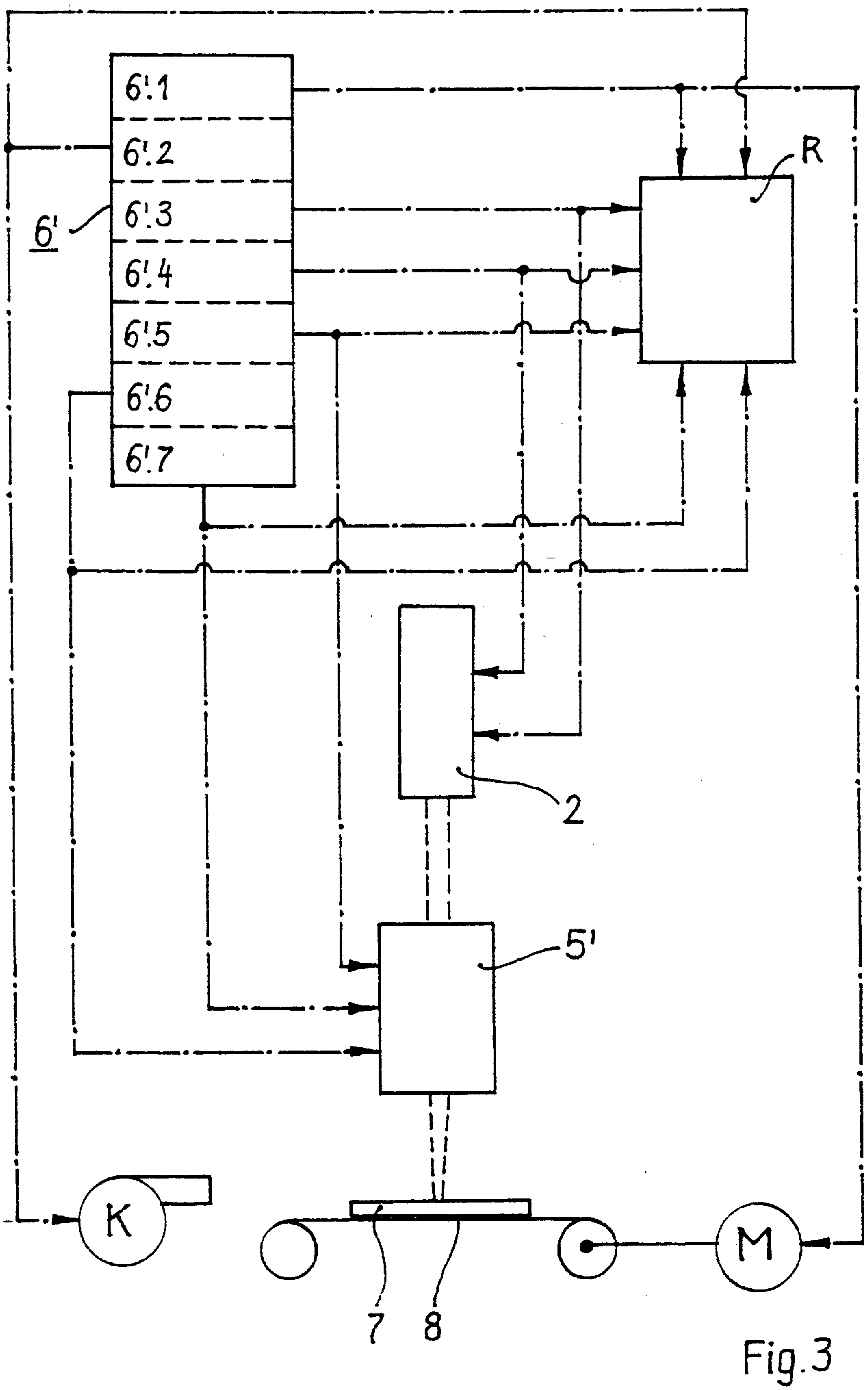
Figure 4:
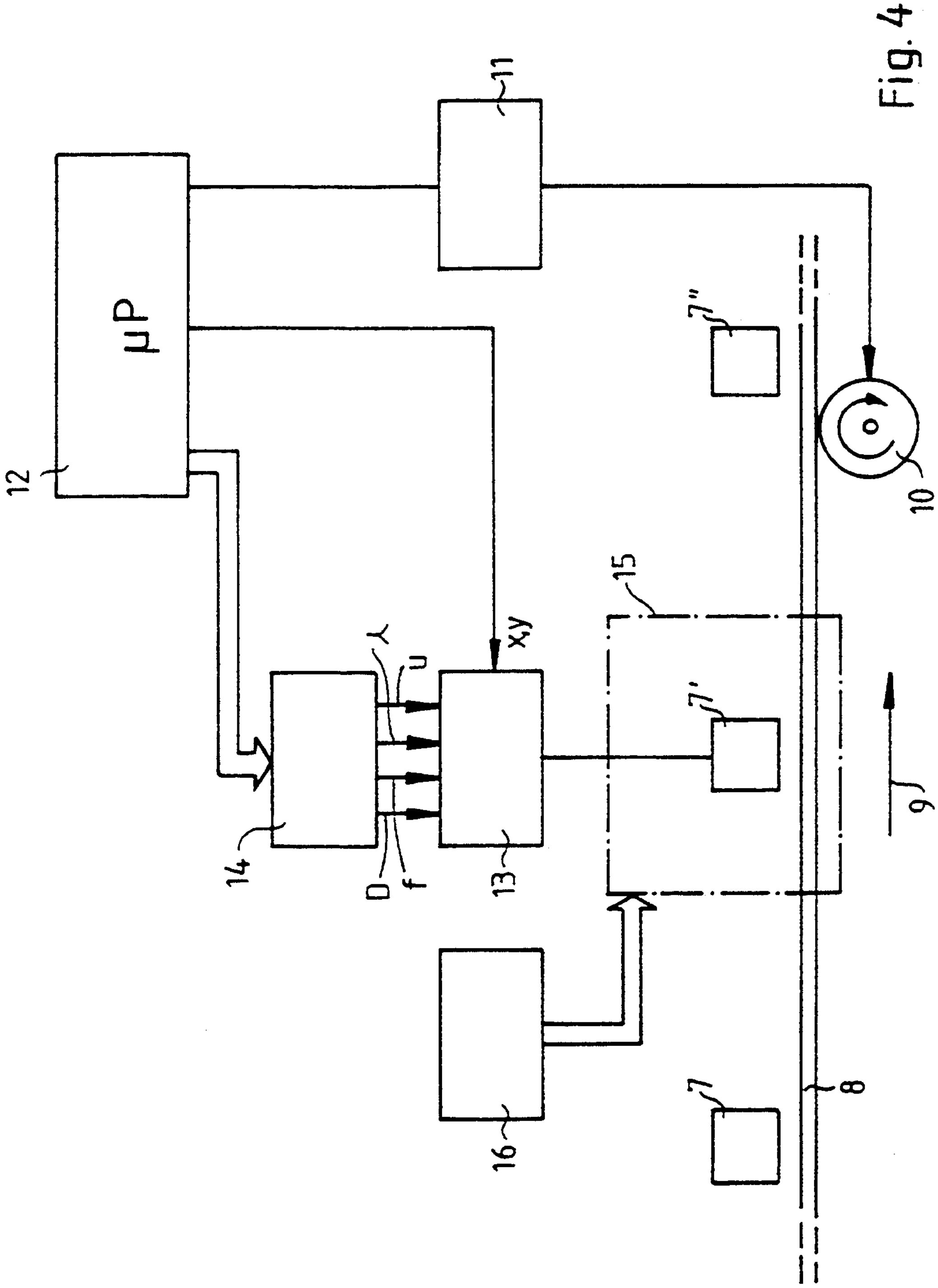
Figure 5:
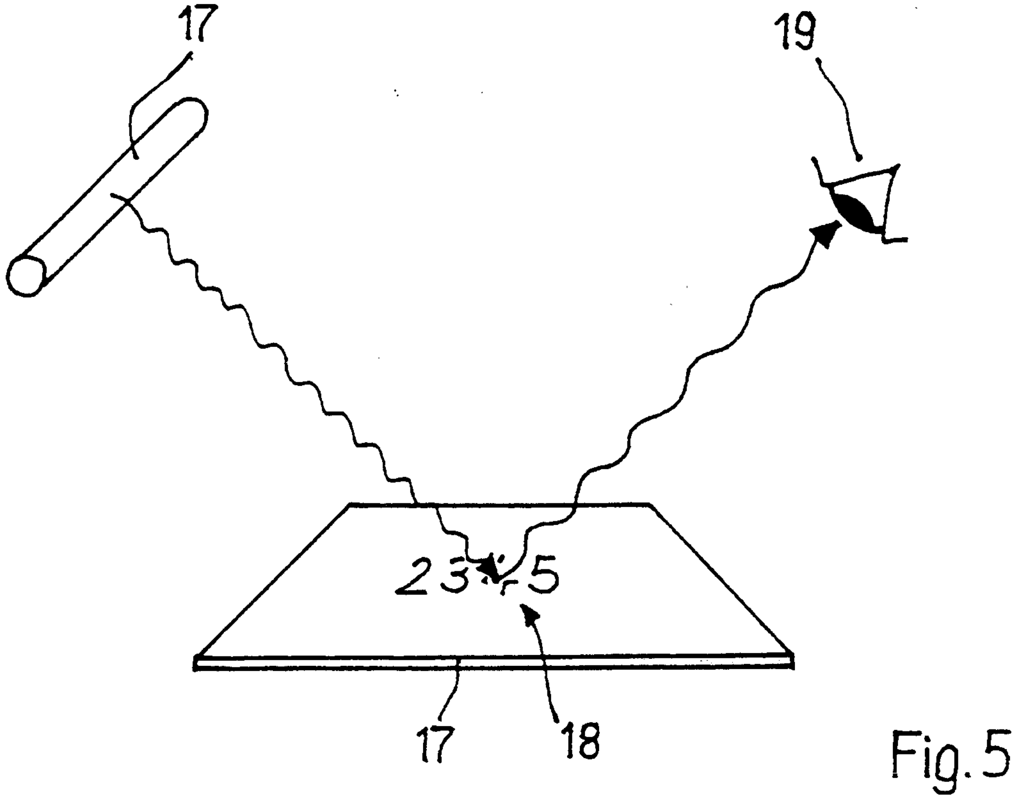

Further advantageous features of the invention are described in the subclaims and will be described in greater detail below together with a description of the preferred embodiments of the invention as shown in the figures. They show:

FIG. 1 a device to record the absorption spectrum in connection with an embodiment of the method, FIG. 2 a schematic representation of a detected absorption spectrum of a material to be labeled, FIG. 3 a schematic representation of an arrangement to determine the process parameters for an embodiment of the method according to the invention, FIG. 4 an example of a device to carry out the method according to the invention in a block diagramm and FIG. 5 an example for an arrangement to read a label created by an embodiment of the method according to the invention.

The relevant arrangement is shown schematically in FIG. 1. The sample 1 of the material of the object to be labeled is radiated with a laserlight from a laser radiation source 2 which can be altered in the relevant frequency range. The laser radiation source 2 is continually altered over the UV/A frequency range of ca. 300 to 450 nm which is chosen with regard to a simple and advantageous analysis of the label.

The reflected radiation from sample 1 is deflected to the spectrometer 4 via a semi-permeable mirror 5. The spectrometer 4 registers the intensity of this radiation dependent on the radiation frequency or the radiation wavelength.

A signal which is proportional to the radiation absorbed by the sample is, by reducing a reference value for the emitted radiation through the reflected radiation (or in the case of a transparent sample the transmitted radiation), recorded dependent on the actual frequency and shown or printed out on a display not shown in this figure. The typical form of the absorption spectrum for paper as an example is shown in FIG. 2.

The selection of the wavelength of the laser radiation to be used for the label radiation occurs in the region of a maximum of the absorption spectrum in the wavelength range from $\lambda = 300$ to 450 nm. Between the values $\lambda 1$ and $\lambda 4$ the value labeled "m" is the maximum of the optically stable energy state. The laser wavelength is selected for the subsequent radiation so that the radiation frequency is essentially the value of the maximum.

Then the suitable radiation parameters, beam direction parameters and cooling parameters are evaluated with which the wanted label can be created economically whilst reliably preventing mechanical material changes by varying the laser radiation parameters (amplitude, impulse frequency, impulse length) and the beam direction values (spot diameter, beam path, writing speed) and parameters for cooling the object to be labeled (heat capacity, inflow quantity and speed of the cooling medium) whilst taking into consideration the size of the writing area and the required resolution.

Dependent on the neccessary contrast requirements (for example mechanical identification system or human eye) for each labeling task an energy $$E_{opt} \geqq E_{min}$$

is selected. This is a threshold which is to be crossed for a short term.

Normally the removal of surplus energy must be provided for in order to fulfill the requirement $$E_{opt} < E_{krit}.$$

$E_{krit}$ is that effective energy input which would lead to a change of the macroscopic structure, i.e. to mechanical, externably feelable and/or in visible light discernable changes to or destruction of the material to be labeled. This value is among other things dependent on the time integral of a heat quantity which is introduced by a writing dot or turned over in the material and which can be increased by suitable measures such as pre-cooling or cooling during the writing process.

The determination of the sensitive energy region $$E_{min} \leqq E_{opt} < E_{krit}$$

and—going from this—the individual process parameters is carried out by the device schematically shown in FIG. 3.

An impulse laser 2 (a nitrogen laser or else an excimer laser pulsed from a gas laser) is used as a light source whose wavelength is fixed at a wavelength of a resonance maximum of the material of the object area to be radiated. In the place of the mirror 5 in FIG. 1 there is a beam formation, focusing and diversion device 5′ which diverts the laser radiation with a pre-set incoming direction and preset focusing state onto an object 7 to be labeled which is situated on the conveyor belt 8 driven by a motor M. The conveyor belt has a cooling gas fan K with variable air flow which can provide the surface of the object 7 with cooling gas.

A central control unit 6′ with the control areas 6′.1 to 6′.7 control the radiation procedures whereas the registration device R registers and stores all of the set parameters during the radiation procedures.

In order to determine the process parameters to be used for the routine labeling of the object a test series with different parameter combinations is carried out—if need be based on already existing guide values.

In order to create the prescribed label pattern the operation intervals and the revolutions of the motor M are controlled by control area 6′.1; the revolutions of the cooling gas fan K by control area 6′.2; the impulse rate by control area 6′.3; the impulse amplitude of the laser by control area 6′.4; and the spot diameter, the position of the focusing plane and the sidewards diversion of the laser beam by control areas 6′.5 to 6′.7. After the trials the created labels are evaluated with respect to their quality, and then the selected set values are evaluated with respect to an economical method and the optimal parameter combination is used as a basis for the routine labeling processes.

In order to keep the thermal interference of the material to be labeled as small as possible and in order to step up the effective energy for labeling $E_{opt}$ by enlargening the critical energy $E_{krit}$ an advantageous variant of the method according to the invention sees that the subsequent frequency for sequentially appliable neighbouring partial elements is selected so small that the process heat between the creation of label elements in sequential steps is taken away, so that during the creation of the next label element the radiation energy which is required to create a permanent label can be introduced without a permanent change happening to the material of the object to be labeled because of this radiation intensity.

The provision of a powerful gas or (depending on the material of the objects to be labeled) liquid cooling allows an acceptable follow frequency also with regard to the process economy of a large series process.

With the method according to the invention the labels can be created in a wide size range, which can be into the microscopic range—on the other hand can be also (after being made visible) be formed as labels which can be analysed directly by the human viewer. All type letters and symbols and their combinations are available as type.

After the radiation wavelength has been selected and the set radiation parameters have Dean determined the creation of the labels can take place.

The labeling in routine operation can take place with the device shown in FIG. 3.

The labeling of objects using a laser with a continuous method for a larger production throughput can be carried out with a modified device as schematically shown in FIG. 4.

With this the objects 7, 7' and 7'' to be labeled are transported stroke by stroke on a conveyor belt 8 in the direction of the arrow 9. The drive 10 of the belt 8 is influenced by a central processor part 12 via a corresponding control device 11. The rest of the device to carry out the method according to the invention is also controlled by this processer part 12. The laser 13 is controlled by a corresponding control part 14 for the laser radiation not only with reference to its impulse length D, but also with reference to the impulse frequency f and the impulse amplitude (voltage u) and its momentary positioning (coordinates x and y). The writing speed can also be influenced by the positioning. The values in question are set by the processor part 12 in view of the above details, whereby the control takes place strokewise in synch with the belt drive 10.

In order to achieve the greatest possible radiation energy without detrimentally influencing the objects to be labeled a cooling chamber 15 (shown in a dashed manner) is provided which envelopes the object 7' to be labeled. If the objects are to be pre-cooled the cooling chamber can extend over a larger area in the opposite direction to the transport direction (arrow 9) of the belt 8.

If the achievable cooling is not sufficient enough to reach the energy threshold Eopt for a complete labeling process with the cooling device such a process can also be split up into a number of steps by labeling partial elements of the selected inscription or symbol whereby these steps are carried out after appropriate time intervals so that a "buffering" of the heat removal can take place utilising the thermal time constants of the material of the object to be labeled. The control of the cooling chamber 15 is by a corresponding control device 16 which is also controlled by the processor part 12.

For certain materials, in particular such materials with absorption or resonance maxima in short wave UV-range, a modification can be useful in that the radiation is a radiation through a metal stencil formed corresponding to the label with fanned out laser light over the stencil surface.

A reading of the labels can in principle again be carried out with a device according to FIG. 1 with reduced laser power. By excitation with radiation in the appropriate frequency range the label can be read with appropriate optically sensitive reading devices (photo sensor, optical camera) due to the optical changes of the incoming radiation caused by the radiation.

Electronmicroscopic tests on labeled materials have shown that the physiochemical structure of the material is not damaged. The effect of acids, bases, solvents, rays in the optical range and electrical and magnetic fields do not destroy the induced labels.

The coding of the labels can be carried out using holographic principles as the inducing radiation is coherent.

A labeling of objects and materials using laser radiation has been made possible with this invention which is therefore only readable with special technical devices and which can therefore not be copied. The method can be used to label cultural objects, valuables, currency, documents and other important and valuable objects in order to protect them from forgery or theft.

A prefered arrangement to read out the labels created by the method according to the invention for daily use as an authenticity test of mass goods is shown in FIG. 5.

In broad outline is shown in FIG. 5 how a label 18 in the form of a row of digits which is not perceptable in visible light and cannot be felt and which is applied to a substantially white plastic card 7 by the UV-radiation of a excimer laser is made visible for the eye of the viewer 19 by radiation with shortwave light from a normal UV-lamp 17 the radiation via the longer wavelength radiaton which is taken up by the viewer.

The perception is based on the fact that the fluorescency characteristics in the radiated areas of the numbers are different to those of the rest of the card which means that the label has differing frequency transmittal characteristics than those of its surroundings.

The present invention is not limited in its embodiments to the above-described preferred embodiment. Rather, a large number of variations are conceivable which make use of the described solution even for very different configurations.

We claim:

1. Method for labeling an object by local radiation of the object in a predetermined area of the object by high energy electromagnetic radiation characterized in that the wavelength of the radiation is chosen to be beyond the visible but within the optical range of the spectrum of electromagnetic radiation, in a range where there is a maximal spectral absorption of this radiation in the predetermined area of the object with respect to this wavelength and that the other parameters of the radiation are thus predetermined that—as a result of material based preliminary tests—due to the interaction of the radiation with the molecule structure in the predetermined area of the object a permanent altering of the optical characteristics is induced which is perceptable when irradiated in the wavelength range of the absorption maximum, but in a way that the area of the object is not mechanically altered and/or that when irradiated with visible light is non perceptably altered.

2. Method according to claim 1, characterized in that the radiation wavelength is within range between 150 and 450 nm.

3. Method according to claim 1 characterized in that the radiation is provided by a laser, preferably by a pulse laser.

4. Method according to claim 1, characterized in that before the step of irradiating to create the label a step of determination of the wave length(s) of the resonance absorption of the material of the predetermined area of the object is carried out by irradiating over a fixed wavelength range and registration of the absorption or reflection dependent on the wave length of the emitted radiation.

5. Method according to claim 1, characterized in that the heat energy dissipated in the material during irradiation is partially removed and/or the object is pre-cooled prior to the step of radiating in such a manner that a substantial permanent mechanical and/or perceptable alteration of the area of the object in visible light due to the dissipated heat energy is avoided.

6. Method according to claim 5, characterized in that the follow frequency for neighboring partial elements of a label which are to be applied consecutively is selected to be so small that the process heat is substantially removed between the creation of partial elements in consecutive steps so that when the next partial element of the label is created the neccessary radiation energy for the creation of a permanent label can be applied without a substantial permanent mechanical and/or perceptable alteration of the area of the object in visible light occuring due to this radiation intensity.

7. Method in accordance with claim 1, characterized in that a coding of the label takes place using holographic methods such that the reading of the thus created coded label can also only take place with coherent light.

8. Device to carry out the method according claim 1 including a light source which can be altered over a wavelength range outside the visible but within the optical range of the spectrum of electromagnetic radiation whereby the wavelength range includes the expected wavelengths of greater spectral absorption of the material to be treated, an optical arrangement to divert the light of the light source onto a sample of material of an area of an object to be labeled, a device to determine the regions of greater spectral absorption of the sample of material within the wavelength range, a light source for the localized radiation of the area of the object with high energy light of a wavelength close to one of the regions of greater spectral absorption whereby this light source can be formed by the light source which can be altered, an arrangement to form and direct the beam of the light of the light source for the localized radiation across the area of the object and an apparatus to set the beam and beam direction parameters during the local radiation in such a manner that in the area of the object a permanent label is created which is perceptable if illuminated with light of appropriate wavelength in the non-visible range of the spectrum but which does not lead to permanent mechanical alterations or perceptable alterations when illuminated with visible light.

9. Device according to claim 8, characterized in that a device (15, 16) to remove a pare of the heat energy which is inputted into or created in the area of the object during radiation and/or an apparatus to pre-cool the area of the object before the beginning of the radiation in such a manner that the occurence of local higher temperatures which are above a temperature at which a permanent mechanical and/or perceptable alteration of the material takes place is prevented.

10. Device according to claim 9, characterized in that the light source for the local radiation (2; 13) is a laser, preferably an impulse laser which can be tuned with respect to its wavelength.

11. Device according to claim 8, characterized in that between the arrangement for the form and direction of the beam (5', 8, M) and the object (1; 7) a stencil is provided to apply the label picture onto the irradiated field of the light source (2; 13) and that the arrangement for the form and direction (5'; 8; M) is so formed that the radiation field covers the whole area of the stencil.

* * * * *